Jan. 25, 1944.   J. HURWITZ   2,339,781
SUGAR DISPENSING DEVICE
Filed Feb. 10, 1942

JULIUS HURWITZ
INVENTOR.

BY John P. Nironow
ATTORNEY

Patented Jan. 25, 1944

2,339,781

UNITED STATES PATENT OFFICE 2,339,781

SUGAR DISPENSING DEVICE

Julius Hurwitz, New York, N. Y., assignor to Alpha Products Company, Inc., New York, N. Y.

Application February 10, 1942, Serial No. 430,221

2 Claims. (Cl. 221—106)

My invention relates to devices for dispensing sugar and has particular reference to devices for delivering measured quantities of granulated sugar or similar granulated or comminuted materials.

My invention has for its object to provide a device for dispensing granulated sugar directly into cups of coffee or similar containers in a quantity of corresponding to a teaspoonful or other convenient measure. I prefer to build my dispensing device in a convenient portable size, so that it can be used by waiters in restaurants for delivering sugar directly into the cups of coffee, etc., for their customers.

My invention is more fully described in the accompanying specification and drawing, in which.

Figure 1:
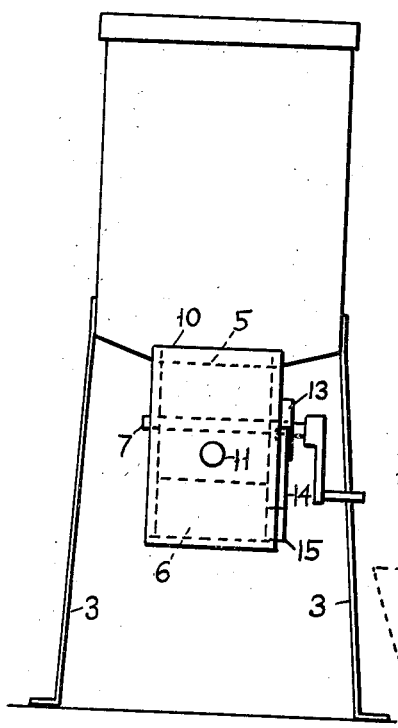
Fig. 1 is a front view of my device.

My dispensing device consists of a container 1, preferably of a portable size and provided with a handle 2 and also legs 3 for supporting the container at an elevation above the surface 4 of a table. The container is provided with a tubular member or extension 5 at the bottom, open at the front and having a downward extending spout 6. A shaft 7 is rotatively supported in the side walls of the container and mounts radially extending blades 8 inside the tubular member 5, closely abutting its inner walls. The front end of the tubular member has flanges 9 engaged by flanged edges of a cover or lid 10 with a handle 11 for removing it when it is desired to inspect or clean the tubular member. The cover forms the front wall of a space or compartment in the tubular member in which rotates the shaft with the blades and prevents the escape of sugar through the upper portion the tubular member.

Figure 2:
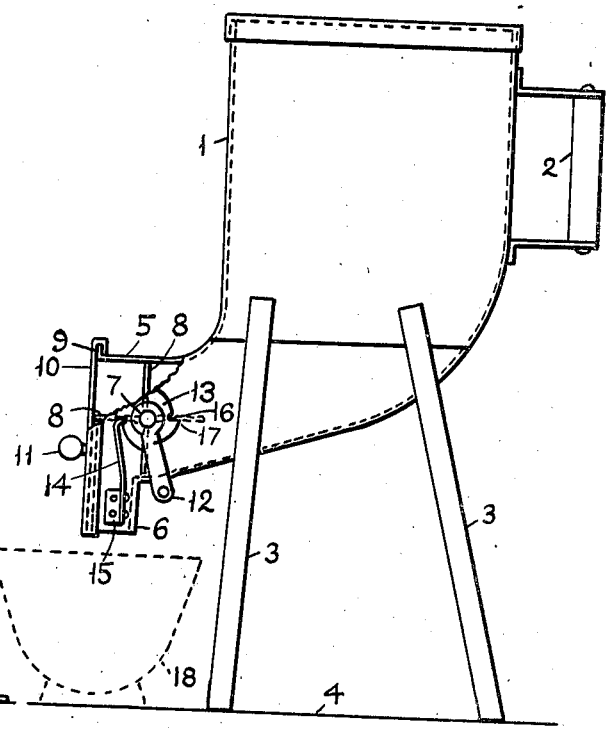
Fig. 2 is an elevational view of my device partly in section.

The outer extension of the shaft has a handle 12 for rotating the shaft with the blades in a clockwise direction, as viewed in Fig. 2. A ratchet wheel 13 is mounted on the shaft, engaged by a resilient pawl 14 whose other end is supported on a bracket 15 attached to the side wall of the tubular member. The ratchet wheel has notches 16 under the teeth 17 for the hooked end of the pawl in order to check the rotation of the shaft when the pawl snaps over one of the teeth 17. The number of the teeth is the same as the number of the blades, and the pawl is so positioned that it snaps over the tooth and yieldably holds the shaft when the blades assume position in which the tubular member is closed as shown in Fig. 2.

Every time the shaft is turned so that the next notch engages the pawl, a measured quantity of sugar is discharged from the container through the spout 6 into a cup 18 shown in dotted lines in Fig. 2. The click of the pawl and the added resistance to rotation indicate the point when the measured or metered quantity of sugar is delivered, this quantity being determined by the space between the two adjacent blades 8 and the bottom wall of the tubular member, the wall being preferably curved at this place concentrically to the shaft 7.

Figure 3:
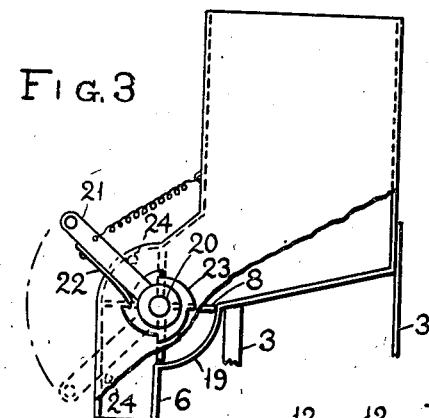
Fig. 3 is a fractional sectional view of a modified device.

For a more accurate metering of the sugar, a modified device can be used, shown in Fig. 3. The tubular member 19 has upper and lower walls curved, as shown, concentrically to the shaft 7 and slidably abutting the ends of the blades 8. The length of the curved portions is such that they cover at least two blades, so that the container 1 is closed by the blades in all positions of the shaft, the metered quantity of the sugar being always exactly the same, regardless of how fast or slow the shaft is turned. Although the shaft 20 may be provided with a ratchet mechanism, as shown in Fig. 2, a modified arrangement is shown in Fig. 3. A handle 21 freely rotates on the shaft 20 and is provided with a spring pawl 22 engaging a ratchet wheel 23. Pins or lugs 24 are provided on the tubular member for limiting the movement of the handle 21, so that a metered quantity of the sugar, represented by the volume between two adjacent blades and the curved wall, is delivered from the spout with every stroke of the handle. Although the sugar may be delivered while rotating the shaft in either direction, the ratchet wheel is shown in this device to be engaged only when the handle is moved downward. A spring 25 returns the shaft into its starting position, the spring pawl sliding over the ratchet wheel during the return movement, so that the shaft does not turn.

Figure 4:
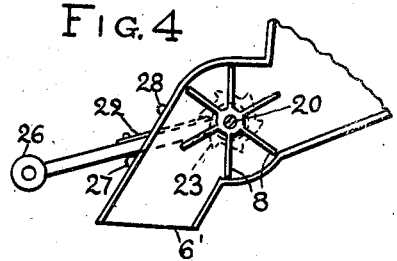
Fig. 4 is a similar view of another modification.

Another modification is shown in Fig. 4, the metering valve being formed with six equally spaced blades 8. The spout 6' is inclined forward and the sugar is delivered in a metered quantity when the heavy handle 26 is raised and the spring pawl 22 engages the ratchet wheel 23. Lugs 27 and 28 limit the movement of the handle so that the shaft is turned one-sixth of a revolution with each downward stroke of the handle, delivering the amount of sugar enclosed between two blades. The weight of the handle brings it back into the starting position.

Figures 5, 6:
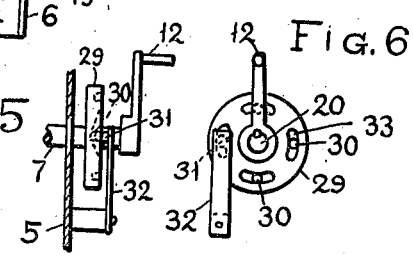
Figs. 5 and 6 are detail views of a modified ratchet mechanism.

Another modification is shown in Figs. 5 and 6, a wheel 29 having holes 30 at the side is engaged by a button 31 at the end of a spring pawl 32. The button is rounded at the end, guiding grooves 33 being provided to facilitate the sliding of the button in and out of the holes 30 when the shaft is rotated. The momentary resistance at the points of engagement and a click indicate the points for stopping rotation of the shaft and insuring accurate metering of the material.

It is understood that my sugar dispensing device may be further modified without departing from the spirit of the invention, as set forth in the appended claims.

I claim as my invention:

1. A sugar dispensing device comprising a container adapted to hold a comminuted material, a tubular member at the bottom of the container, a shaft rotatively supported in the walls of the tubular member, blades extending in a substantially radial direction from the shaft forming compartments adapted to hold measured quantities of the comminuted material, means to manually rotate the shaft, a wheel on the shaft having teeth corresponding to the blades for preventing backward rotation and having slots under the teeth, and a resilient member yieldably engaging the slots for yieldably stopping the shaft after every delivery.

2. A sugar dispensing device comprising a container adapted to hold a comminuted material, a rectangular, substantially horizontal tubular member at the bottom of the container having a sliding vertical cover at the front, a shaft rotatively supported in the walls of the tubular member, blades extending in a substantially radial direction from the shaft successively abutting upper and lower walls of the tubular member and the cover forming compartments adapted to hold measured quantities of the comminuted material, means to manually rotate the shaft, and means to yieldably stop the rotation of the shaft upon completion of the movement corresponding to the angular distance between two blades for delivering the measured quantity of the material.

JULIUS HURWITZ.